June 14, 1949.　　　　C. O. DONLEY　　　　2,473,331
HELICOPTER POWER AND CONTROL MECHANISM
Filed Oct. 20, 1944　　　　　　　　　　4 Sheets-Sheet 1

INVENTOR.
CARSON OLIVER DONLEY.
BY
Lockwood, Goldsmith, Galt,
ATTORNEYS.

June 14, 1949.  C. O. DONLEY  2,473,331
HELICOPTER POWER AND CONTROL MECHANISM
Filed Oct. 20, 1944  4 Sheets-Sheet 2
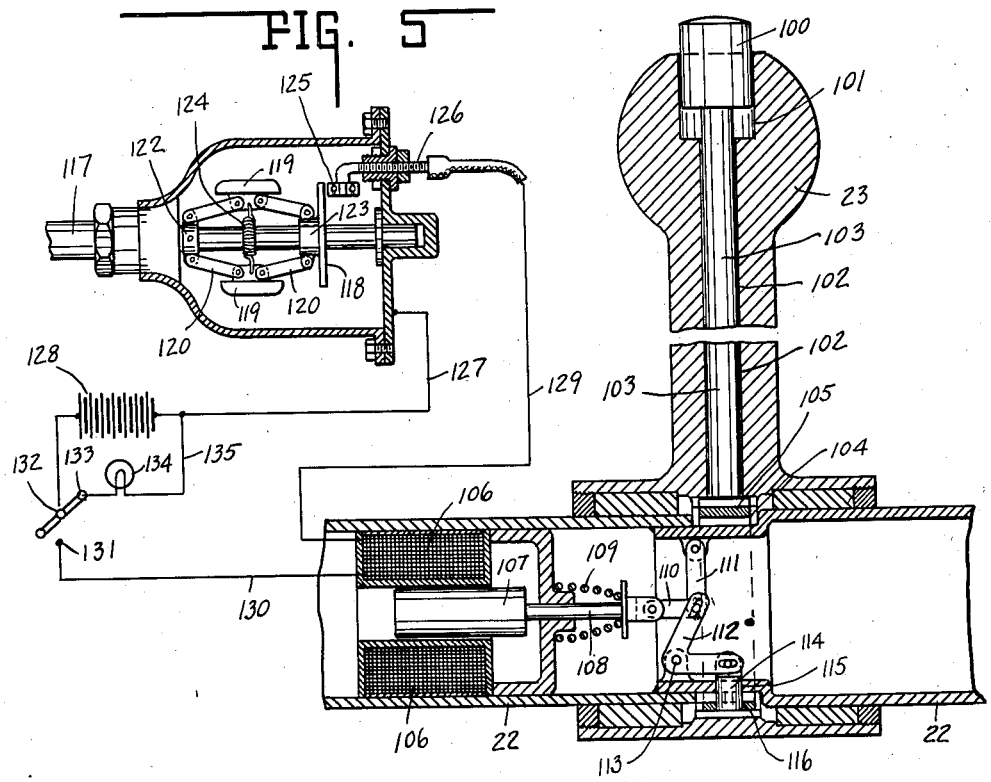
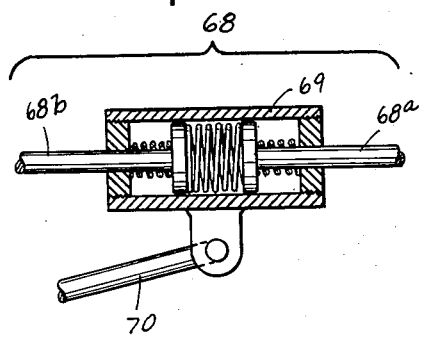
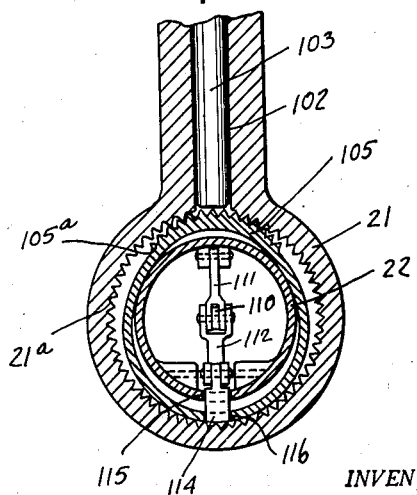
INVENTOR.
CARSON OLIVER DONLEY.
BY
Lockwood, Goldsmith & Galt,
ATTORNEYS.

June 14, 1949.  C. O. DONLEY  2,473,331
HELICOPTER POWER AND CONTROL MECHANISM
Filed Oct. 20, 1944  4 Sheets-Sheet 3
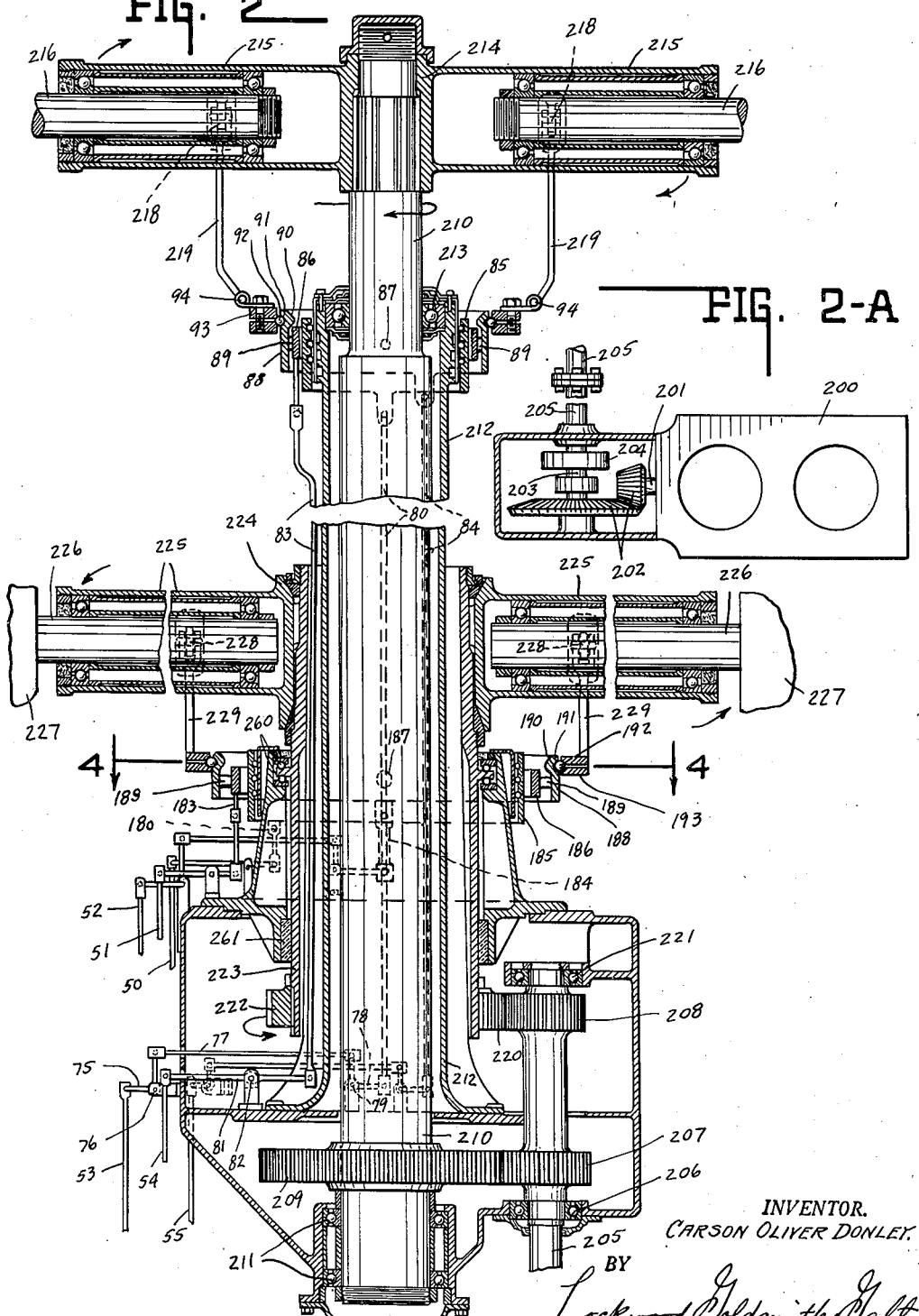
INVENTOR.
CARSON OLIVER DONLEY
BY
Lockwood, Goldsmith & Galt
ATTORNEYS.

June 14, 1949.     C. O. DONLEY     2,473,331
HELICOPTER POWER AND CONTROL MECHANISM
Filed Oct. 20, 1944     4 Sheets-Sheet 4

INVENTOR.
CARSON OLIVER DONLEY.
BY
Lockwood, Goldsmith & Galt
ATTORNEYS.

Patented June 14, 1949

2,473,331

UNITED STATES PATENT OFFICE 2,473,331

HELICOPTER POWER AND CONTROL MECHANISM

Carson O. Donley, Indianapolis, Ind., assignor to Vertiflite, Inc., Indianapolis, Ind., a corporation Application October 20, 1944, Serial No. 559,609

6 Claims. (Cl. 170—135.26)

This invention relates to a helicopter control.

The chief object of this invention is to control helicopter superposed oppositely rotating blades so that the helicopter can hover, rise, lower, move forwardly, backwardly or sidewardly, as well as turn at the will of the operator, said helicopter including but two oppositely rotating multi-bladed rotors.

The chief feature of the invention resides in the pedal, wheel and lever controls and their association with the superposed rotating blades for effecting the helicopter control aforesaid.

Another chief feature of the invention resides in the interposed superposed control rings connected directly to said blades for position or pitch control thereof, so that in rotation the blade position may be varied cyclically.

Another chief feature of the invention consists of the use of automatic cyclic pitch control to effect transverse lift equalization in each rotor, thus permitting a smaller distance between the planes of the upper and lower rotors than could be obtained with rotors in which lift equalization was obtained by hinged, flapping blades, because of the reduction in bending of the rotor blades and hubs with equalized lift in each rotor during forward rotation.

Another feature of the invention in a two-bladed rotor embodiment thereof is that the lower rotor may be turned by hand until it is parallel with the longitudinal axis of the helicopter. This action, through the gearing, also will similarly position the upper rotor blades. This will greatly facilitate the parking and storage of the helicopter for then the entire space required for storage or parking only will be that equal to the maximum width of the fuselage section in a transverse direction, to the rotor diameter in a longitudinal direction and to the static height of the helicopter in a vertical direction.

Still a further feature of the invention disclosed herein resides in a coaxial contra-rotating rotor helicopter with a minimum distance between the planes of rotation of the upper and lower rotor which permits reduction to a minimum of the size and weight of the helicopter structure, thereby increasing its range of utility and all without loss of the cyclic pitch control function.

Other objects and features of the invention will be set forth more fully hereinafter.

The full nature of the invention will be understood from the accompanying drawings and the following description and claims.

In the drawings:

Fig. 1A is a central sectional view of a connector between controls.

Fig. 2 is a central sectional view of the control rings and the last mentioned connections thereto and the connections from the master control rings to the adjustably positionable rotatable blades.

Fig. 2A is a side view of an opposed engine with power and clutch connections to the drive shown in Fig. 2.

Fig. 5 is a vertical sectional view through one manual control lever, a locking arrangement, a manual control associated therewith, and an engine speed, safety control also associated therewith.

Fig. 6 is a vertical sectional view taken at right angles to Fig. 5 and of the control lever, etc.

Figure 1:
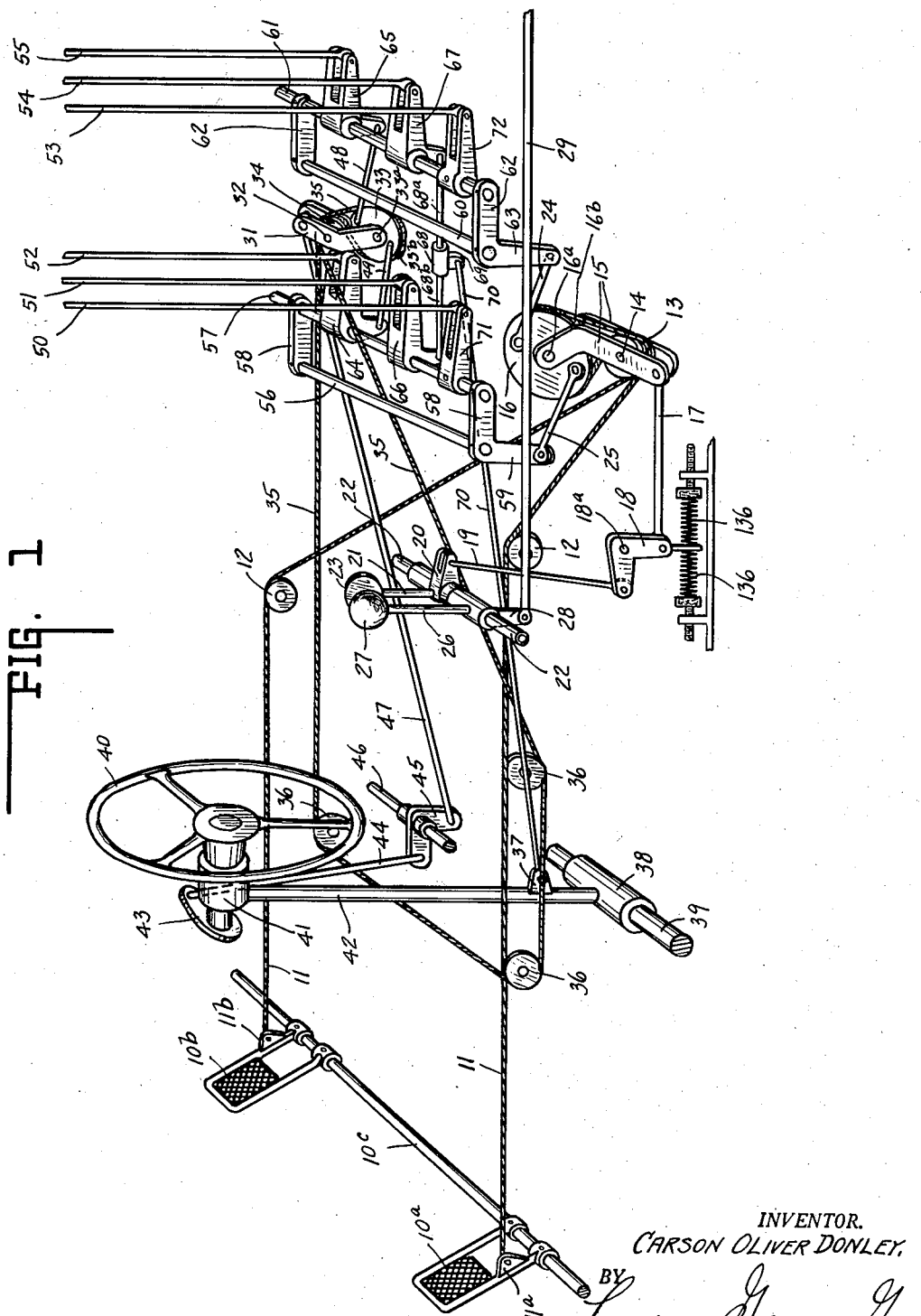
Fig. 1 is a perspective view of the manually operable members for effecting the control, the mechanism directly associated therewith and the connections to the control rings.

In Fig. 1 of the drawings $10^a$ and $10^b$ indicate pedals independently and pivotally mounted on shaft $10^c$. Connected to each pedal as at $11^a$ and $11^b$ is cable $11$ passing over pulleys $12$, and thence over double pulley $13$ pivoted at $14$. Arms $15$ also are pivoted at $14$ and at one end rotatably support at $16^a$ the wheel $16$ about which in groove $16^b$ is positioned the cable $11$.

When pedal $10^a$ is moved forward and pedal $10^b$ moved rearward, cable $11$ rotates wheel $16$ in one direction, and when the pedals are reversely actuated, wheel $16$ is reversely rotated. Reference will be had to the effect of this action hereinafter.

To the other end of arms $15$ is pivotally connected link rod $17$ connected to bell crank $18$ pivoted at $18^a$ and also connected to the rod $19$ connected at its opposite end to arm $20$ rigid with lever $21$ pivoted at $22$ and terminating in the hemispherical hand-grip $23$.

When this hand-grip is tilted forwardly or rearwardly, arms $15$ are turned clockwise or counter-clockwise respectively upon pivot $14$. This moves wheel $16$ bodily to the rear or front respectively of its neutral position.

Since rods $24$ and $25$ are connected to wheel $16$, cable movement causes these rods in effect to approach each other, or rather their remote ends, or to separate, while movement of lever 21—23 will cause said rods to bodily move forwardly or rearwardly without any relative position change. Note that both controls can be effected in either direction successively or simultaneously.

Pivotally mounted on shaft 22 is lever 26 having hemispherical hand-grip 27. Arm 28 rigid therewith is connected to the engine throttle control rod 29 by which the speed of the engine and hence the speed of blade rotation is controlled. The two hand-grips 23—27 may be shifted independently of each other or simultaneously, however, normally simultaneous operation with one hand would be employed since the two controls are allied in function. For American helicopters, these members will be on the left of the operator and for British helicopters, they will be at the right of the operator.

Opposite the arms 15 are the arms 31 pivoted at 32, and pivotally supported thereby at 33ª is wheel 33. Concentric with pivot 32 is the dual pulley 34 and in the grooved periphery 33ᵇ of said wheel 33 and about pulley 34 is cable 35. This cable passes about pulley 36 and is secured to bracket 37 on post 42 rotatably supported at 38 on shaft 39.

Wheel 40 rotatably mounted at 41 on the same post or standard 42 carries arm 43 connected by link rod 44 to bell crank 45 pivoted at 46 and connected by link rod 47 to the other end of arms 31 aforesaid for tilting the arms and wheel 33 about pivot 32. Connected to wheel 33 are rods 48 and 49.

Hence, in a similar manner rods 48—49 may be bodily moved forwardly or rearwardly by rod 47 and by rotation of wheel 40 or may be caused to separate at their outer ends or approach each other incident to the movement of cable 35 aforesaid due to movement of wheel 40 and post 42 forwardly and rearwardly. These two operations in either direction may be effected simultaneously or successively as desired.

Reference will now be had to the right-hand portion of Fig. 1. Therein are illustrated two groups of three rods each and same are designated as 50, 51, 52, 53, 54 and 55, reading from left to right. To the left of these rods is cross-shaft 56 and parallel thereto is shaft 57. Arms 58 rigidly connect same together. One arm includes extension 59 to which rod 25 is connected.

In like manner between the two sets of rods is positioned shaft 60 and parallel thereto is shaft 61. These are connected together by arms 62 and one of them has extension 63 connected to the other end of rod 24.

Hence, when arms 15 are pivoted clockwise, the shafts 57 and 61 are simultaneously tilted upwardly and counter-clockwise about the axes of shafts 56 and 60; when tilted reversely, naturally shafts 57 and 61 correspondingly lower. However, when wheel 16 is rotated clockwise, shaft 57 lowers while shaft 61 rises. When wheel 16 is reversely rotated, shaft 57 is raised and shaft 61 is lowered.

Shaft 57 has rotatably supported thereon bell crank 64 having one end connected to the lower end of control rod 52. The other end of said bell crank is connected to the other end of rod 49 connected to wheel 33. On shaft 61 is rotatably supported the bell crank 65, one end of which is connected to the lower end of control rod 55 and the other end of which is connected to one end of rod 48; the other end of which is connected to the wheel 33.

Thus when rod 47 (due to wheel 40 rotation) is actuated, both rods 52 and 55 are actuated similarly, i. e. raised or lowered. When post 42 is moved forward or backward, the rods 52 and 55 are moved oppositely of each other, to-wit, up and down respectively or vice versa respectively.

Rod 51 at its lower end connects to one end of the bell crank 66 while the rod 54 at its lower end connects to one end of a similarly directed bell crank 67. These bell cranks are rotatably supported upon shafts 57 and 61 respectively. The other ends of said bell cranks are connected together by link rod structure 68 having links 68ª and 68ᵇ mounting bracket 69 to which is suitably connected one end of rod 70 having its other end also connected to bracket 37 on post 42. Link rod structure 68 may include a resilient intermediate connection, see Fig. 1A, same being enclosed by the tubular portion of bracket 69, said connection preventing binding of the parts. Thus movement forwardly and rearwardly of post 42 causes lowering and raising respectively and simultaneously of control rods 51 and 54.

The lower end of rod 50 is connected to arm 71 pinned to shaft 57. The lower end of rod 53 is similarly connected to arm 72 similarly secured to shaft 61. Thus when shafts 57 and 61 are raised and lowered respectively, or vice versa, or are simultaneously raised or lowered, the control rods 50 and 53 partake of corresponding movements.

Naturally in all cases the amount of movement imparted to the several rods 50 to 55 inclusive is proportional to the amount of manual control movement effected at the pedals, the post, the wheel and the hand lever. The extent of these movements are so proportioned as to produce both reasonable control pressures and proper aerodynamic effects.

The foregoing constitutes a detailed description of the several control members the connections therefrom, and the respective control rods and specific movements of same. Before describing how these effect helicopter control, it appears desirable to refer to Fig. 2 for the control ring disclosures, their connections to the adjustable blades and the control rod connections to said rings. Following such description, a brief résumé of helicopter control will be included herein.

Referring to Fig. 2, it will be observed that all six control rods 50 to 55 inclusive are illustrated insofar as the upper ends thereof are disclosed. In Fig. 2 the upper end of rod 53 connects to one end of bell crank 75 pivoted at 76. The other end connects to link rod 77 connected to one end of bell crank 78, pivoted at 79, the other end being connected to the lower end of rod 80. Rod 54 at its upper end connects to one end of lever 81 pivoted at 82 and the other end connects to the lower end of rod 83. The upper end of rod 55 is similarly associated with the lower end of rod 84. Rod 80 raises and lowers only the upper control structure. The controls in Fig. 1 also effect similar raising and lowering respectively of rods 83 and 84.

An inner control ring 85 is anti-frictionally supported on the upper end of stationary tube 212 and externally thereof. Control rod 80 is connected to said ring. A second ring 86 is diametrically pivoted at 87 on ring 85 and connected to ring 86 is the upper end of rod 83. In like manner ring 88 is diametrically pivoted at 89 upon ring 86, such pivoting being transverse to that at 87. This is a universal joint arrangement. Rods 83 and 84 can each tilt their respective rings independently of the other or both simultaneously.

Ring 88 includes an upper extension 90 provided with an external groove 91 serving as a ball race for balls 92 retained therein by the two piece outer and pitch control ring 93 to which the lower end of each of the blade pitch control rods 219 is suitably secured as at 94.

Actuation of any one of rods 80, 83 or 84, any two of them, or all of them will obviously control the position of the groove 91 wherefore the upper pitch control ring 93 will rotate in a plane determined by said groove.

The lower control ring is similarly actuated. Herein, the inner ring is designated by numeral 185, the next outer ring by 186, the immediate outer ring by 188 and the lower pitch control ring by 193. To the latter is connected the lower end of each blade pitch control rods 229.

As before, ring 186 is diametrically pivoted on ring 185 at 187 and ring 188 is similarly pivoted on ring 186 at 189, such, however, being transverse to pivots 187. As before, ring 188 includes extension 190 with external groove 191 to seat balls 192 retained by lower control ring 193.

Figure 4:
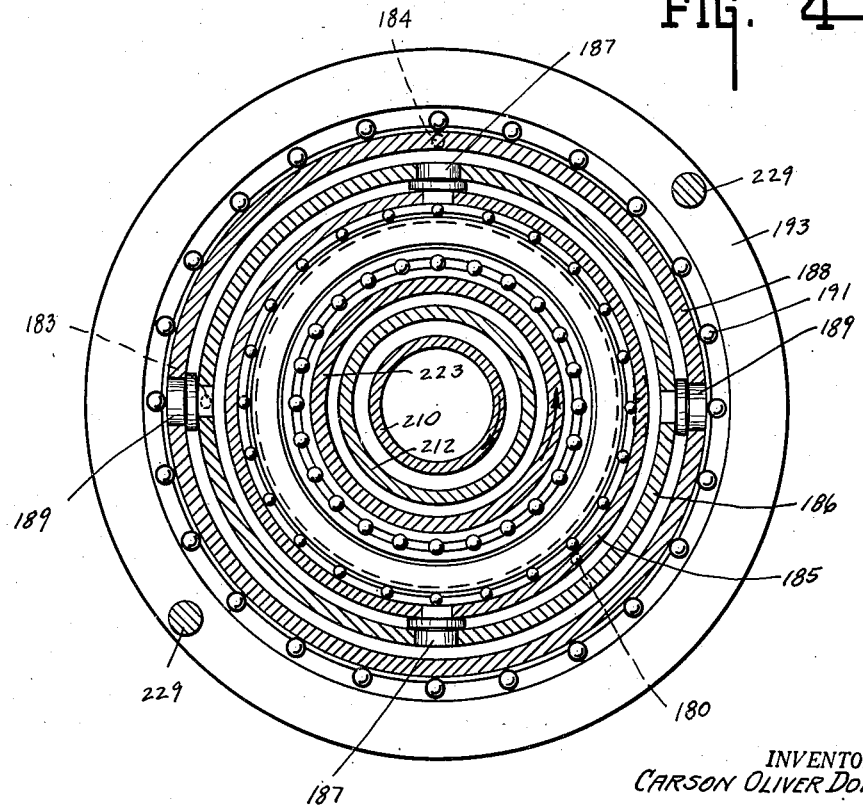
Fig. 4 is an enlarged sectional view of one of the control ring structures and is taken on line 4—4 of Fig. 2 and in the direction of the arrows.

Rod 180, connected to inner ring 185, is operatively connected at its lower end to the upper end of rod 50 in substantially the same manner as rod 80 is connected to rod 53. The true position of rod 180 connection is shown in Fig. 4. For illustration purposes in Fig. 2, section rod 180 is shown approximately 180° from its true position. Likewise rod 183 (connected to ring 186) is operatively connected at its lower end to the upper end of rod 51 in substantially the same manner as rod 83 is connected to rod 54. Also rod 184 (connected to ring 188) is operatively connected to rod 82 in substantially the same manner as rod 84 is connected to rod 55.

Accordingly, the lower control ring 193 is controlled as to its plane of rotation by rods 180, 183 and/or 184 in a manner broadly comparable to but not necessarily specifically the same as upper control ring 93 is controlled or it will be remembered that the several rods 50 to 55 inclusive may effect selective simultaneous or differential control as desired.

In Fig. 2A 200 indicates an engine such as a conventional four or six cylinder horizontal opposed air cooled airplane engine. This engine is controlled by throttle rod 29 aforesaid, see Fig. 1. Shaft 201 through gear reduction 202 (herein a 3 or 4 to 1 spiral bevel gear reduction) drives shaft 203 to which is connected a free wheeling unit or equivalent overrunning clutch 204.

Shaft 205 therefrom is rotatably supported in bearing 206 and mounts gears 207 and 208. Gear 207 meshes with gear 209 carried by tubular shaft 210 rotatably supported by bearing 211. This shaft is the upper rotor support and drive.

A stationary tube 212 supports at its upper end bearing 213 that maintains shaft 210 vertical or upright. On the upper end and rigid, and hence, rotatable therewith is hub 214 including the desired number of equally spaced radially directed sockets 215 in each of which is rotatably mounted a shaft 216 carrying blade 217. Shaft 216 has rigid therewith arm 218 to which is pivotally connected the upper end of a pitch control rod 219. The lower end of same is connected to the upper control ring.

On shaft 205 is gear 208 meshing with idler gear 220. Shaft 205 at its upper end is supported by bearing 221. This idler gear meshes with gear 222 splined or suitably secured to the lower end of drive tube 223 which near its upper end mounts hub 224 having radial sockets 225 to rotatably mount shafts 226 carrying blades 227. Drive tube 223 is carried in bearings 260 and 261. Each shaft has rigid therewith arm 228 connected to the upper end of a control rod 229, the lower end of which is connected to the lower control ring.

Rods 50, 51 and 52 control the latter ring and through levers are connected to rods 180, 183 and 184 respectively external of tubular shaft 223. Rods 53, 54, 55 control the upper ring and through levers are connected to rods 80, 83 and 84 respectively external of the tubular shaft 210 and sleeve 212 and internal of tubular shaft 223. The last mentioned levers are positioned below the lower end of shaft 223.

In view of the prior description relative to rods 50 to 55 controlling the upper and lower control rings, no further description is believed necessary. The structure so far described accordingly is directed to oppositely rotatable (equal speed), superposed, coaxial multi-bladed rotors, with non-flapping blades, cyclically controlled to effect the desired control of the helicopter which requires no other auxiliary or ancillary propellers or rotors.

*Operation*

The foregoing basic disclosure accordingly incorporates a main lift control to accomplish vertical ascent or descent of the helicopter, a forward and rearward control to accomplish forward or blackward flight of the helicopter, a lateral motion control to accomplish side-ways motion to the right or left of the helicopter, and a further control to secure rotation of the body of the machine (fuselage) about a vertical axis by means of unequal torque in the upper and lower rotors.

This invention includes automatic cyclic pitch control; that is, during the rotor rotation the blades of each rotor in each revolution thereof are automatically varied as to pitch.

The automatic cyclic pitch control is used to accomplish control of the helicopter in flight in any desired direction as above mentioned, in addition to effecting lift equalization in each rotor on each side of an axis longitudinal with the helicopter through the center of each rotor.

Thus, the pitch of the advancing blade of the upper and lower rotors is decreased and that of the retreating blade (in a four-bladed structure) is increased by properly tilting the pitch control rings, actuated by the same motion of the control utilized to secure forward motion of the helicopter. This action is necessary to secure the above-mentioned equalization of lift in the advancing and retreating blades of each rotor. The magnitude of this cyclic pitch variation is adjusted by properly proportioning the levers, cables, etc., 37, 35, 31, 32, 34, 33, 33a, 49, 48, 65, 64, and associated control mechanism in Fig. 2, to essentially provide equal lift in each rotor on each side of the aforesaid longitudinal axis. Since the forward motion of the helicopter is controlled by forward motion of post 42, and the necessity for lift equalization in each rotor occurs only through rapid horizontal motion of the helicopter (usually forward) and the consequent variation of the air velocity over advancing and retreating rotor blades, then, by suitably proportioning, as mentioned above, the magnitude of this cyclic pitch variation, the lift equalization is effected automatically with forward or rearward motion of post 42. This is the equivalent of the flapping of hinged rotor blades of many single lift rotor helicopters.

This is accomplished as follows: Movement of post 42 upon shaft 39 forward or backward operates rod 70, used only for forward and rearward motion, and cable 35. Said post movement through cable 35 rotates sheave 33 which actuates rods 48 and 49 so that rods 52 and 55 are differentially actuated to actuate rods 84 and 184 to tilt rings 93 and 193 differentially, that is, one up and the other down relatively as it were.

The main lift control is lever 21. To increase the lift of the helicopter for take-off or to obtain increased altitude while in flight, this lever is moved forward. This actuates rod 17 in a similar direction. Naturally to lower the helicopter while in flight, lever 21 is moved toward the rear (right in Fig. 1) and rod 17 moves similarly.

Rod 17 when moved forward (to the left in Fig. 1) tilts members 15 clockwise upon pivot 14. This moves both rods 24 and 25 toward the right tilting shafts 56 and 60 counter-clockwise so that shafts 57 and 61 move upwardly and to the left which elevates all rods 50 to 55, wherefore the upper and lower control rings 93 and 193 are oppositely shifted. Upward movement of rods 50 and 53 cause downward movement of rods 180 and 80 respectively.

Rods 51 and 54 similarly lower rods 183 and 83, and thus no tilting of rings 186 and 86 occur relative to inner rings 185 and 85. Rods 52 and 55 also move up and rods 184 and 84 also move down so that no relative tilting is effected. Hence, control rings 193 and 93 bodily move down which pull down on rods 229 and 219 respectively to tilt the blades on their horizontal axis and therefore, change the pitch of same.

Rod 17 movement to the right (see Fig. 1) similarly causes opposite tilting of the blades upon their horizontal axes. Pitch increase as aforesaid or decrease as last mentioned causes an increased lift in each rotor, or a decreased lift in each rotor and causes the helicopter to rise or lower respectively.

Figure 3:
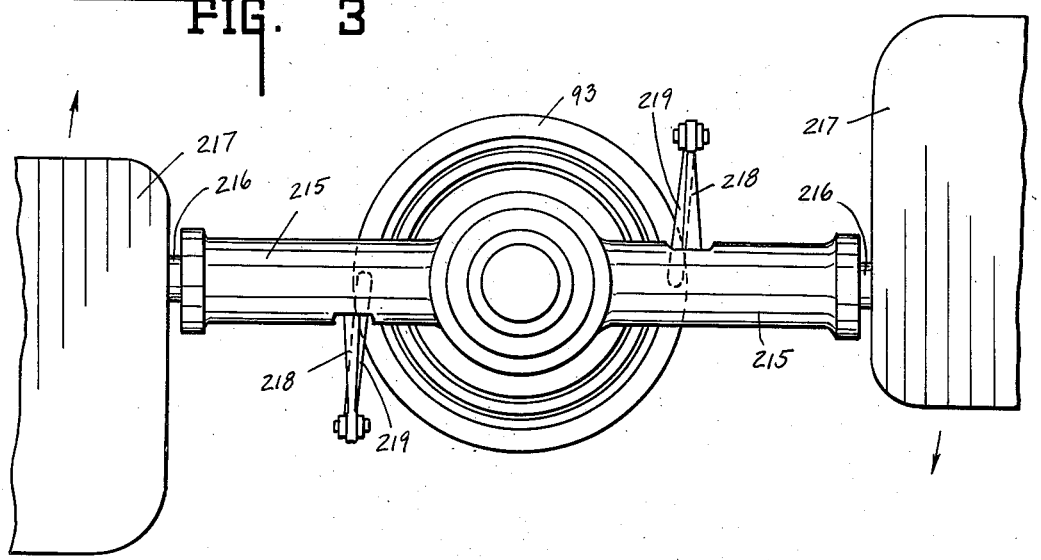
Fig. 3 is a top plan view of the hub ends of the upper blades and power and control thereto.

Lateral control for obtaining lateral motion of the helicopter is accomplished by rotating control wheel 40 about its axis. Rotation counter-clockwise lifts rod 44 and pulls rod 47 forwardly. Rotation clockwise pushes rod 47 rearwardly. These effect turning to the left or right respectively as follows: Forward movement of rod 47 tilts the levers 31 counter-clockwise on pivot 32. This moves rods 48 and 49 rearwardly. This in turn raises or tilts arms 65 and 64 respectively counter-clockwise on shafts 61 and 57 respectively and raises rods 55 and 52 respectively. This through leverage causes rods 84 and 184 to lower tilting rings 88 and 188 upon pivots 89 and 189 respectively causing control rings 93 and 193 to tilt correspondingly. Note that the control rings thus are depressed on the right side in Figs. 2 and 3 and raised on the left side. Consequently, pitch control rods 219 and 229 move down and increase the rotor pitch of the blade while forward or on the right side and move up and decrease the rotor pitch of the blade while rearward or on the left side.

This is a cyclic variation and effects tilting of the helicopter counter-clockwise about its horizontal axis for this cyclic variation causes a turning moment, and hence, rotation of the machine in a counter-clockwise direction.

Forward motion of the helicopter is produced by a forward movement of the control wheel, causing the machine to tilt about a transverse axis and incline the lift rotor forward. Forward wheel movement tilts post 42 forward upon its axis at shaft 39. This causes extension 37 and rod 70 to move forward. This tilts downwardly (clockwise) arms 66 and 67 and lowers rods 51 and 54. This in turn effects a raising of rods 183 and 83 to tilt intermediate ring 186 and 86 about pivots 187 and 87 which similarly tilts the rings 188 and 193 and 88 and 93 respectively.

Forward motion may be stopped by returning the wheel to its previous neutral position. Rearward movement is effected by reverse action, that is, pulling back on wheel 40.

Rotation of the helicopter body about a vertical axis is controlled by the action of the foot pedals 10a and 10b connected to cable 11 associated with pulleys 16 and 13 as follows: Movement of either pedal produces a turning movement on wheel 16 and same through rods 24 and 25 moves shafts 57 and 61 oppositely or differentially, that is, one moves down and the other up, and vice versa, if the wheel 16 is rotated clockwise and counter-clockwise respectively.

The result of this action is to turn to the right or left upon the vertical axis of the helicopter such turning being effected through arms 71 and 72 pinned to shafts 61 and 57. Movement of these pedals from their normal flight position thus produces a difference in pitch between the upper and lower rotors, thereby making the torque unequal between the same and consequently causing a turning movement about the vertical axis of the helicopter opposite of the direction of rotation of the rotor having the greater torque.

The production of sufficient engine power to maintain flight is dependent upon engine speed and herein (Fig. 1) 29 indicates a throttle rod controlled by lever 26 having the hemispherical handle 27. Movement forwardly thereof secures increased engine speed and the reverse movement secures reduced speed.

When each rotor has three blades, the control rods 229 and 219 are displaced 120° apart, when there are four blades the rods are displaced 90° apart, and when there are but two, as illustrated herein, the rods are displaced 180° apart.

Herein pivots 87 and 187 are horizontally directed and transverse of the horizontal longitudinal axis of the helicopter. Also pivots 89 and 189 are horizontally directed and parallel to the horizontal longitudinal axis of the helicopter.

Reference will now be had to Figs. 5 and 6, and wherein certain safety and convenience devices are illustrated. Mounted in the hemispherical pitch control handle 23 is a button 100 seated in recess 101 in said handle. In bore 102 in lever 21 is a rod 103. Bore 102 communicates with recess 101 and rod 103 at its upper end mounts the button 100. Shaft 22 is a two part structure for assembly purposes, and in groove 104 formed externally therein is the spring lock 105. This is a free expansion ring and pressure collapsible. This ring has teeth 105a which normally engage internal peripheral teeth 21a on lever 21 confronting groove 104. Pressure on the button 100 releases this spring lock by deforming ring 105 to provide tooth clearance relative to teeth 21a for lift control, otherwise the lever is normally locked to the shaft 22 and is immovable in whatever position it has been adjusted. This eliminates the necessity for holding lever 22 in the desired position.

Means for automatically returning the lift control to auto-rotation pitch includes a spring 136, Fig. 1, and an adjustable stop set to auto-rotation pitch. Herein solenoid 106 is included in the shaft 22. Associated therewith is core 107 carried by stem 108 constrained by concentric conical spring 109 to "deenergized" position (to the right in Fig. 5). Link 110 connects said stem to link 111 and bell crank 112 pivoted at 113. Necessary pin and slot connections are included wherever necessary as for example, between lever 112 and plunger locking pin 114 radially reciprocable in tube 22 and seated in hole 115 thereof.

Spring ring 105, diametrically opposite teeth 105a, has aperture 116 therein for plunger reception. An engine actuatable centrifugally operable switch structure includes shaft 117 operable proportional to engine speed. Slidable thereon is plate contact 118 and the weights 119 are pivotally connected by links 120 to hub 122 pinned to shaft 117 and to the hub 123 on plate 118. Springs 124 normally draw the links inwardly and extend plate 119 to the right, Fig. 5, into engagement with roller contact 125 on the adjustably and insulatably mounted arm 126.

When the engine is operating at a predetermined minimum or greater speed, plate 119 is held out of contact from roller 125 by centrifugal force upon weights 119 in opposition to springs 124. Thus the circuit through this switch is automatically closed when the engine is below minimum speed and opened when the engine attains sufficient speed.

Line 127 leads from a source of energy 128 to the plate portion 118 of the switch. Line 129 connects insulated arm 126 to solenoid 106. Line 130 therefrom leads to switch contact 131 adapted for contact by arm 132 connected by line 133 to the opposite side of the source 128. Adjacent switch 131—132 is contact 133 connected to a warning signal 134, such as a red light, in turn connected by line 135 to source 128. Now when switch 131—132 is open, switch 132—133 is closed, and the signal is energized. When deenergized, the solenoid circuit is conditioned for operation subject to the engine responsive speed switch as previously described.

The speed control switch upon engine failure or dangerous slow down closes the solenoid circuit and the solenoid core 107 moves left to retract plunger 114, which normally keys together shaft 22 and spring ring 105, from ring aperture 116. Thereupon opposed springs 136, see Fig. 1, operatively connected to lever 23, return the lever 23 and the ring 105 to neutral position wherein the pitch of the rotor blades is that required for autogyro operation. The helicopter then glides to a landing, the rotor blades being driven in the manner of an autogyro, since they are disconnected from the engine through the action of the overrunning clutch 204, Fig. 2A.

Removal of the engine failure and the subsequent bringing of the engine up to safe flying speed deenergizes the solenoid 106. The spring 109 in the tube 22 then attempts to force the plunger 114 outward. The pilot then shifts the arm 23 until the plunger 114 can seat automatically in the ring aperture 116. Then button 100 is depressed to release the arm 23 from the ring 105. The arm 23, when so released, is returned to starting position and the ring 105 is now locked to shaft 22 as shown in Figs. 5 and 6.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A rotor control for a helicopter having a rotor with a variable pitch power blade, a blade pitch varying control member, a control element responsive to rotor speed, a locking member normally constrained to locking relation with said blade pitch control member, manually operable means for unlocking said locking member, and means responsive to operation of said control element incident to rotor speed failure so constructed and arranged to unlock said locking member and to automatically effect auto rotational pitch positioning of the power blade and the blade pitch varying control member connected thereto.

2. In a helicopter control system having a tiltable and rotatable control wheel means, foot operable means adjacent thereto and independent hand operable means adjacent both means, the combination of a pair of controls each including three reciprocable members, a hollow member connected to each reciprocable member and movable thereby, said hollow members of each said control being connected successively one to another and pivotally adjustable one upon another, a blade pitch control member directly connected to one of the hollow members and responsive to movement of any and all connected hollow members, and means connecting the six reciprocable members to said first three means for helicopter control.

3. A system as defined by claim 2 wherein means connects certain of the hollow members for simultaneous and similar operation.

4. A system as defined by claim 2 wherein means connects certain of the hollow members for simultaneous and opposite operation.

5. A system as defined by claim 2 wherein means connects certain of the hollow members for similar and simultaneous operation, and other means connects certain other members for opposite and simultaneous operation.

6. In a helicopter having substantially coaxially arranged oppositely rotatable shafts, one extending through the other and with an appreciable space therebetween, variable incidence bladed propellers for each shaft and rotatable thereby, means at each propeller hub for blade incidence variation, means external of each shaft for last mentioned means control, the control means external of the inner shaft extending through the outer shaft, and a single means provided for simultaneously actuating each of the external means.

CARSON O. DONLEY.

REFERENCES CITED

The following references are of record in the file of this patent:

UNITED STATES PATENTS

| Number | Name | Date |
|---|---|---|
| 1,919,089 | Breguet et al. | July 18, 1933 |
| 1,986,709 | Breguet et al. | Jan. 1, 1935 |
| 2,070,610 | Myers | Feb. 16, 1937 |
| 2,256,635 | Young | Sept. 23, 1941 |
| 2,271,473 | Bennett | Jan. 27, 1942 |

FOREIGN PATENTS

| Number | Country | Date |
|---|---|---|
| 185,827 | Switzerland | Nov. 2, 1936 |
| 302,752 | Great Britain | Dec. 27, 1928 |